United States Patent
Kazama et al.

(10) Patent No.: US 12,547,486 B2
(45) Date of Patent: Feb. 10, 2026

(54) MANAGEMENT APPARATUS, INFORMATION PROCESSING SYSTEM, AND MANAGEMENT METHOD

(71) Applicant: Fsas Technologies Inc., Kawasaki (JP)

(72) Inventors: Satoshi Kazama, Kawasaki (JP); Kazuhiro Suzuki, Kawasaki (JP); Hiroshi Endo, Fuji (JP)

(73) Assignee: Fsas Technologies Inc., Kawasaki (JP)

( * ) Notice: Subject to any disclaimer, the term of this patent is extended or adjusted under 35 U.S.C. 154(b) by 33 days.

(21) Appl. No.: 18/632,516

(22) Filed: Apr. 11, 2024

(65) Prior Publication Data

US 2024/0362096 A1 Oct. 31, 2024

(30) Foreign Application Priority Data

Apr. 28, 2023 (JP) ................. 2023-074563

(51) Int. Cl.
*G06F 11/00* (2006.01)
*G06F 11/07* (2006.01)
*G06F 11/32* (2006.01)

(52) U.S. Cl.
CPC ........ *G06F 11/006* (2013.01); *G06F 11/0727* (2013.01); *G06F 11/0793* (2013.01); *G06F 11/321* (2013.01)

(58) Field of Classification Search
CPC ............... G06F 11/006; G06F 11/0727; G06F 11/0793; G06F 11/321
See application file for complete search history.

(56) References Cited

U.S. PATENT DOCUMENTS

| | | | |
|---|---|---|---|
| 11,175,984 B1* | 11/2021 | Lercari | G06F 11/108 |
| 2005/0015647 A1* | 1/2005 | Okada | G06F 11/0775 |
| | | | 714/E11.207 |
| 2012/0179804 A1 | 7/2012 | Katanp et al. | |

(Continued)

FOREIGN PATENT DOCUMENTS

| JP | 2011-197845 A | 10/2011 |
|---|---|---|
| JP | 2011-253332 A | 12/2011 |

(Continued)

OTHER PUBLICATIONS

Extended European Search Report received for European Patent Application No. 24169937.0, mailed Sep. 6, 2024, 8 pages.

*Primary Examiner* — Joshua P Lottich
(74) *Attorney, Agent, or Firm* — ArentFox Schiff LLP

(57) ABSTRACT

A memory stores management information where identification information of each of a plurality of devices used by an information processing apparatus, first positional information, and second positional information are associated with one another. The first positional information indicates a position of a device storage storing the plurality of devices. The second positional information indicates a storage position of each of the plurality of devices in the device storage. A processor receives failed device information including identification information of a failed device among the plurality of devices from the information processing apparatus. The processor identifies the position of the device storage storing the failed device and the storage position of the failed device in the device storage from the identification information of the failed device included in the failed device information on the basis of management information.

15 Claims, 10 Drawing Sheets

(56) References Cited

U.S. PATENT DOCUMENTS

| | | | |
|---|---|---|---|
| 2012/0198446 A1 | 8/2012 | Sawa et al. | |
| 2013/0254428 A1* | 9/2013 | Kodama | G06F 11/004 |
| | | | 709/250 |
| 2015/0248369 A1 | 9/2015 | Takeuchi | |
| 2017/0193003 A1* | 7/2017 | Vijayan | G06F 3/0647 |
| 2019/0004901 A1* | 1/2019 | Ryan | G06F 1/3253 |
| 2019/0278648 A1* | 9/2019 | Nayak | G06F 11/008 |
| 2020/0004650 A1 | 1/2020 | Hanko et al. | |
| 2020/0089409 A1* | 3/2020 | Ankireddypalle | G06F 11/1453 |
| 2024/0028433 A1* | 1/2024 | Tsai | G06F 11/0751 |
| 2024/0362096 A1* | 10/2024 | Kazama | G06F 11/0793 |

FOREIGN PATENT DOCUMENTS

| | | |
|---|---|---|
| JP | 2012-160095 A | 8/2012 |
| JP | 2022-517890 A | 3/2022 |
| WO | WO 2020/005468 A1 | 1/2020 |

* cited by examiner

| Box# | Rack# | U# |
|---|---|---|
| 2 | 1 | 10 |
| 3 | 2 | 20 |

FIG. 7

| Box# | Slot# | BDF |
|---|---|---|
| 2 | 1 | 10:00.0 |

FIG. 8

| Box# | Slot# | BDF |
|---|---|---|
| 2 | 1 | 10:00.0 |
| 2 | 2 | 20:00.0 |

FIG. 9

| Box# | Slot# | BDF |
|---|---|---|
| 2 | 2 | 20:00.0 |

FIG. 10

MANAGEMENT APPARATUS, INFORMATION PROCESSING SYSTEM, AND MANAGEMENT METHOD

CROSS-REFERENCE TO RELATED APPLICATION

This application is based upon and claims the benefit of priority of the prior Japanese Patent Application No. 2023-074563, filed on Apr. 28, 2023, the entire contents of which are incorporated herein by reference.

FIELD

The embodiments discussed herein relate to a management technique for identifying a failed device.

BACKGROUND

A server is equipped with a baseboard management controller (BMC) that manages the server. The BMC stores a correspondence table indicating correspondences between slot numbers of peripheral component interconnect express (PCIe) slots and bus device functions (BDFs) of PCIe cards inserted into the PCIe slots.

The BDFs are identification information of the PCIe cards, and each include a combination of a bus number, a device number, and a function number. In the following description, a PCIe slot might be simply referred to as a "slot".

When any of the PCIe cards fails, the BMC is notified of the BDF of the failed PCIe card through a PCIe bus. The BMC converts the BDF into a slot number on the basis of the correspondence table and notifies a user of the obtained slot number. The user can identify an installation position of the server with an identification (ID) lamp on the server and then identify the failed PCIe card from the slot number. The user is, for example, an operator who performs maintenance work of the server.

With respect to failures of servers, method for maintaining failure tolerance of storage devices in composable infrastructure is known (e.g., refer to Patent Document 1). Method for identifying a physical position of a PCIe card in a failed input/output (I/O) drawer are also known (e.g., refer to Patent Document 2).

Technique relating to identification of an I/O failure card in a computer system is also known (e.g., refer to Patent Document 3). Technique for improving failure tolerance of a virtualized computer system is also known (e.g., refer to Patent Document 4).

Patent Document 1: Japanese National Publication of International Patent Application No. 2022-517890
Patent Document 2: Japanese Laid-open Patent Publication No. 2011-197845
Patent Document 3: Japanese Laid-open Patent Publication No. 2011-253332
Patent Document 4: Japanese Laid-open Patent Publication No. 2012-160095

SUMMARY

According to an aspect of the embodiments, a management apparatus includes a memory and a processor.

The memory stores management information where identification information of each of a plurality of devices used by an information processing apparatus (computer), first positional information, and second positional information are associated with one another. The first positional information indicates a position of a device storage storing the plurality of devices. The second positional information indicates a storage position of each of the plurality of devices in the device storage.

The processor receives failed device information including identification information of a failed device among the plurality of devices from the information processing apparatus. The processor identifies the position of the device storage storing the failed device and the storage position of the failed device in the device storage from the identification information of the failed device included in the failed device information on the basis of management information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a box information table;
FIG. 8 is a diagram illustrating a device information table;
FIG. 9 is a diagram illustrating the device information table to which an entry has been added;
FIG. 10 is a diagram illustrating the device information table from which an entry has been deleted.

DESCRIPTION OF EMBODIMENTS

An embodiment will be described in detail hereinafter with reference to the drawings.

In a server system having a composable disaggregation infrastructure (CDI) configuration, PCIe cards used by a server are stored in a plurality of PCIe boxes outside the server, and PCIe cards connected to the server can be dynamically changed. It might take a long time, however, to identify a failed PCIe card.

Such a problem occurs not only in a server system having a CDI configuration but also in various information processing systems. Such a problem occurs not only when a failed PCIe card in a PCIe box is identified but also when one of various failed devices in various storages is identified. This problem will be described hereinafter more specifically.

In a server system having a CDI configuration, the number and positions of PCIe boxes included in a logical system configuration might change in accordance with PCIe cards connected to a server. Since BDFs of PCIe cards dynamically change in accordance with the logical system configuration, a BMC in the server does not recognize the BDF of each PCIe card and a position of a PCIe box storing the PCIe card.

Figure 1:
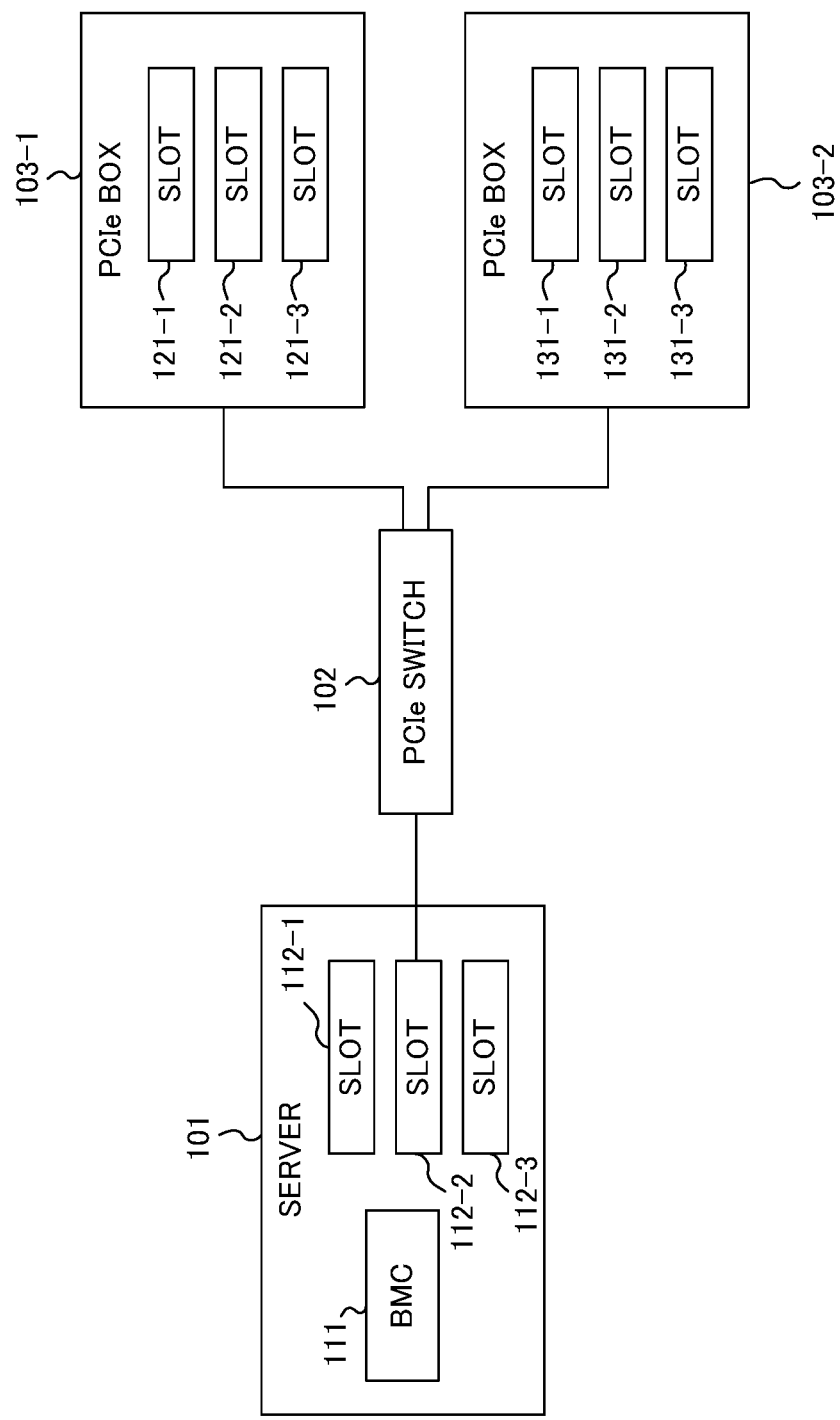
FIG. 1 is a diagram illustrating configuration of a server system in a comparative example.

FIG. 1 is a diagram illustrating configuration of a server system in a comparative example. The server system in FIG. 1 is a server system having a CDI configuration, and includes a server 101, a PCIe switch 102, a PCIe box 103-1, and a PCIe box 103-2.

The server 101 includes a BMC 111 and slots 112-1 to 112-3. A PCIe card is inserted into the slot 112-2. The PCIe box 103-1 includes slots 121-1 to 121-3. A PCIe card is inserted into each slot 121-$i$ (i=1 to 3). The PCIe box 103-2 includes slots 131-1 to 131-3. A PCIe card is inserted into each slot 131-$i$ (i=1 to 3).

The PCIe switch 102 is connected to the PCIe card inserted into the slot 112-2, and is also connected to the PCIe box 103-1 and the PCIe box 103-2. The user can construct a logical system configuration by connecting a desired slot 121-$i$ or 131-$i$ to the slot 112-2 through the PCIe switch 102.

If the PCIe card inserted into the slot 131-2 fails during operation of a logical system configuration including the PCIe card, for example, the BMC 111 is notified of the BDF of the failed PCIe card through a PCIe bus. The BMC 111, however, does not recognize a position of the PCIe box 103-2 and the BDF of the PCIe card inserted into the slot 131-2.

In this case, the BMC 111 displays error information indicating a server error on a management screen of a user terminal apparatus, which is not illustrated. The user looks at the displayed error information, notices occurrence of the failure in the server system, and conducts an investigation to identify the failed PCIe card. This investigation is conducted, for example, in the following procedure.

(P1) The user stops an application running in the server system.
(P2) If the user can log in to the server 101, the user logs in to the server 101 and analyzes a log to identify a failed PCIe card.
(P3) If the user cannot log in to the server 101, the user constructs individual logical system configurations by separately connecting PCIe cards inserted into the slot 121-$i$ and the slot 131-$i$ to the slot 112-2. The user then checks presence or absence of failures of the PCIe cards one by one to identify a failed PCIe card.
(P4) The user identifies a position of a PCIe box 103-$j$ (j=1 or 2) storing the failed PCIe card by performing manual work such as tracing connection of cable.

When the user conducts an investigation, however, it might take a long time to identify a failed PCIe card. In addition, since the user is required to have failure determination skills, it is difficult for an inexperienced user to identify a failed PCIe card. Furthermore, since a stop range of the server system is wide, availability of the server system is impaired.

Figure 2:
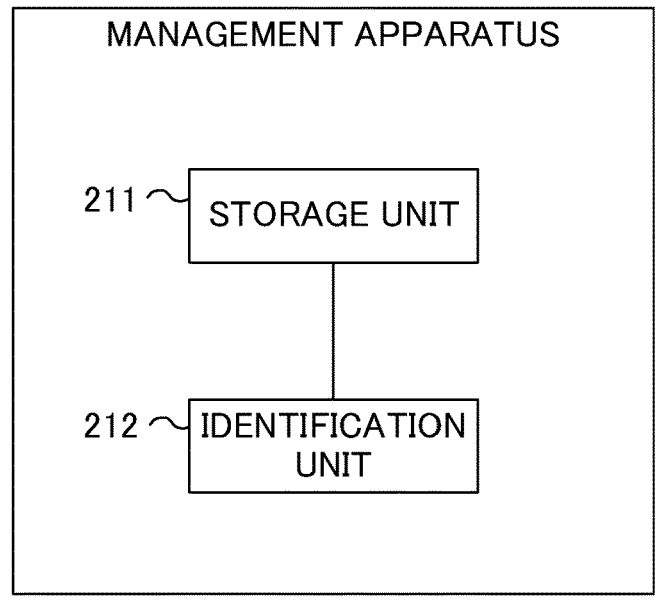
FIG. 2 is a diagram illustrating functional configuration of a management apparatus according to an embodiment.

FIG. 2 illustrates an example of functional configuration of a management apparatus according to the embodiment. A management apparatus 201 of FIG. 2 includes a storage unit 211 and an identification unit 212.

The storage unit 211 stores management information where identification information of each of a plurality of devices used by the information processing apparatus, first positional information, and second positional information are associated with one another. The first positional information indicates a position of a device storage storing the plurality of devices. The second positional information indicates a storage position of each of the plurality of devices in the device storage.

Figure 3:
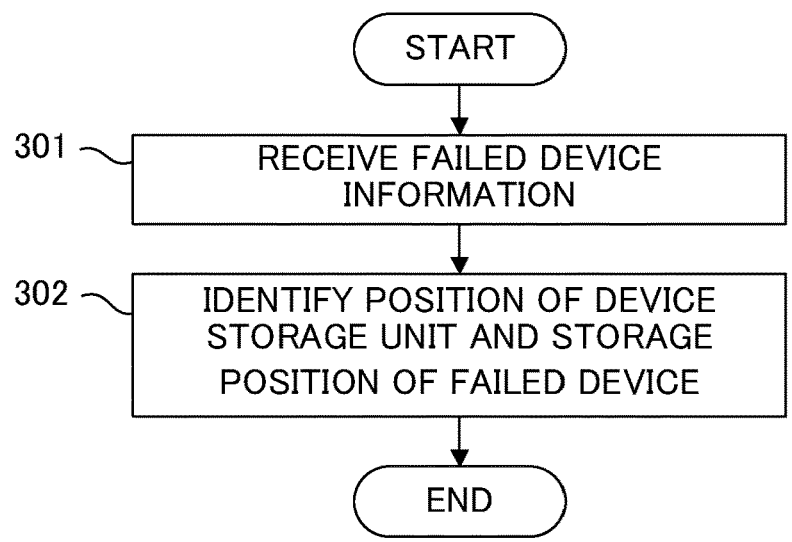
FIG. 3 is a flowchart illustrating a position identifying process.

FIG. 3 is a flowchart illustrating an example of a position identifying process performed by the management apparatus 201 of FIG. 2. First, the identification unit 212 receives failed device information including identification information of a failed device among the plurality of devices from the information processing apparatus (step 301). Next, the identification unit 212 identifies the position of the device storage storing the failed device and the storage position of the failed device in the device storage from the identification information of the failed device included in the failed device information on the basis of management information (step 302).

With the management apparatus 201 of FIG. 2, a position of a failed device can be easily identified among a plurality of devices used by the information processing apparatus.

Figure 4:
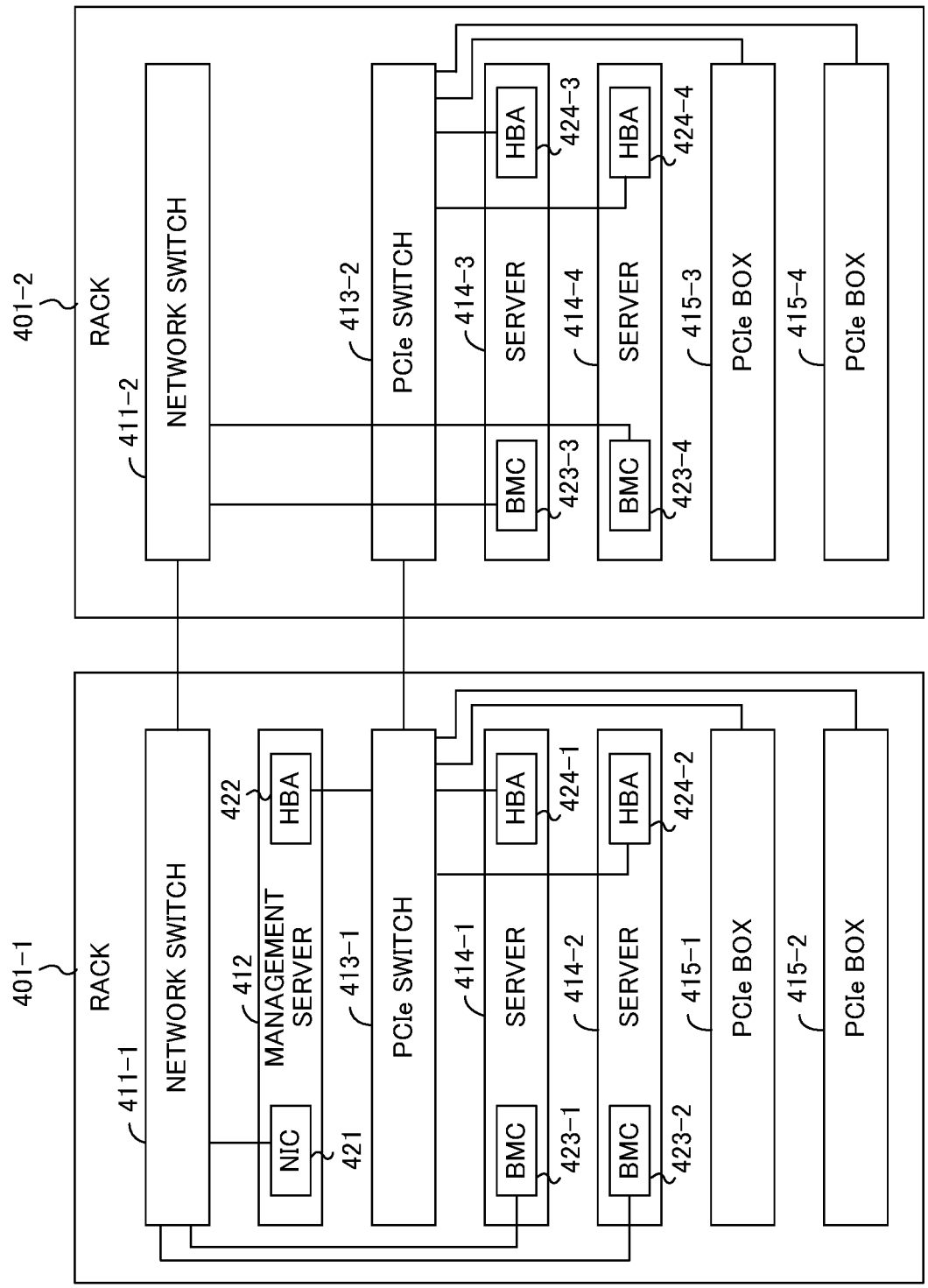
FIG. 4 is a diagram illustrating hardware configuration of a server system.

FIG. 4 illustrates an example of hardware configuration of a server system including the management apparatus 201 of FIG. 2. The server system of FIG. 4 includes racks 401-1 and 401-2. A rack 401-$k$ (k=1 or 2) is also called a "housing". The server system of FIG. 4 is an example of an information processing system.

The rack 401-1 includes a network switch 411-1, a management server 412, a PCIe switch 413-1, a server 414-1, a server 414-2, a PCIe box 415-1, and a PCIe box 415-2. These components are hardware. The management server 412 corresponds to the management apparatus 201 of FIG. 2.

The rack 401-2 includes a network switch 411-2, a PCIe switch 413-2, a server 414-3, a server 414-4, a PCIe box 415-3, and a PCIe box 415-4. These components are hardware.

The management server 412 includes a network interface controller (NIC) 421 and a host bus adapter (HBA) 422. The NIC 421 and the HBA 422 are hardware communication devices.

A server 414-$j$ (j=1 to 4) includes a BMC 423-$j$ and an HBA 424-$j$. The BMC 423-$j$ is a hardware control device that manages the server 414-$j$, and the HBA 424-$j$ is a hardware communication device. The server 414-$j$ corresponds to the information processing apparatus.

The network switch 411-1 is connected to the NIC 421, the BMC 423-1, the BMC 423-2, and the network switch 411-2. The PCIe switch 413-1 is connected to the HBA 422, the HBA 424-1, the HBA 424-2, the PCIe box 415-1, the PCIe box 415-2, and the PCIe switch 413-2.

The network switch 411-2 is connected to the BMC 423-3, the BMC 423-4, and the network switch 411-1. The PCIe switch 413-2 is connected to the HBA 424-3, the HBA 424-4, the PCIe box 415-3, the PCIe box 415-4, and the PCIe switch 413-1.

The server 414-1 and the server 414-2 can access the PCIe box 415-1 and the PCIe box 415-2 through the PCIe switch 413-1. The server 414-1 and the server 414-2 can also access the PCIe box 415-3 and the PCIe box 415-4 through the PCIe switch 413-1 and the PCIe switch 413-2.

The server 414-3 and the server 414-4 can access the PCIe box 415-3 and the PCIe box 415-4 through the PCIe switch 413-2. The server 414-3 and the server 414-4 can also access the PCIe box 415-1 and the PCIe box 415-2 through the PCIe switch 413-2 and the PCIe switch 413-1.

The number of racks 401-$k$ included in the server system may be one, or three or more. The number of servers 401-$j$ included in each rack 414-*k* may be one, or three or more. The number of PCIe boxes 415-*j* included in each rack 401-*k* may be one, or three or more.

Figure 5:
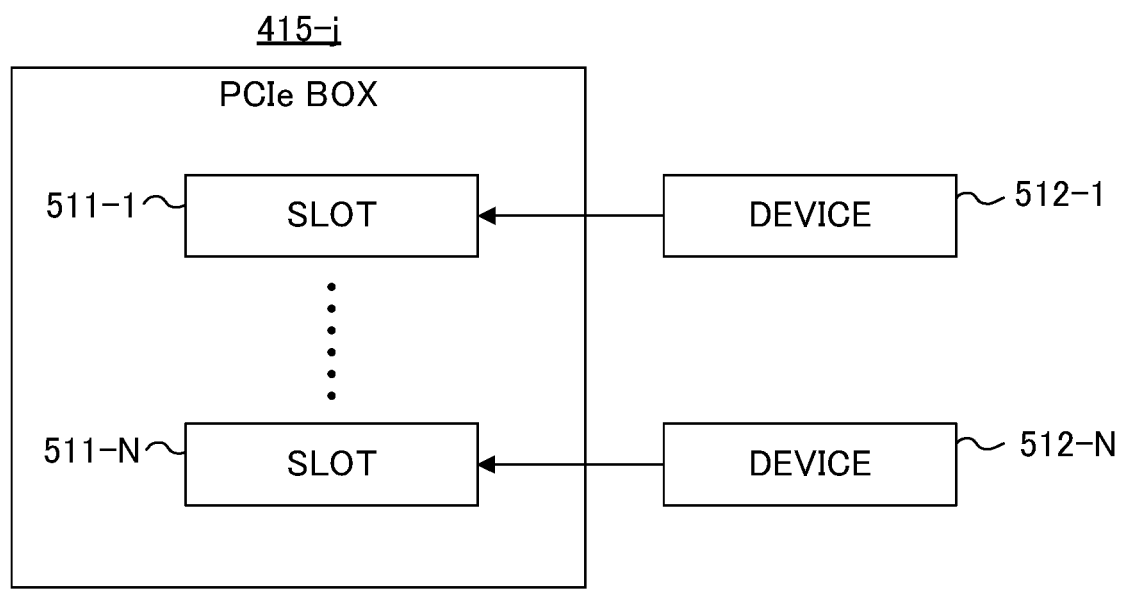
FIG. 5 is a diagram illustrating configuration of a PCIe box.

FIG. 5 illustrates an example of configuration of the PCIe box 415-*j* (j=1 to 4) of FIG. 4. The PCIe box 415-*j* of FIG. 5 includes slots 511-1 to 511-N (N is an integer of 1 or more). A detachable device 512-*i* such as a PCIe card is connected to a slot 511-*i* (i=1 to N). The device 512-*i* may be an NIC, a graphics processing unit (GPU), or a solid-state drive (SSD). The PCIe box 415-*j* corresponds to the device storage storing devices.

The user can construct a logical system configuration for the server 414-*j* by connecting the slot 511-*i* in each PCIe box 415-*j* to the server 414-*j* through the PCIe switch 413-*k*.

The device 512-*i* included in the logical system configuration for the server 414-*j* is a device 512-*i* recognizable from an operating system (OS) of the server 414-*j*. The PCIe box 415-*j* storing the device 512-*i* recognizable from the OS is a PCIe box 415-*j* to be managed. The device 512-*i* recognizable from the OS corresponds to a device used by the information processing apparatus.

Figure 6:
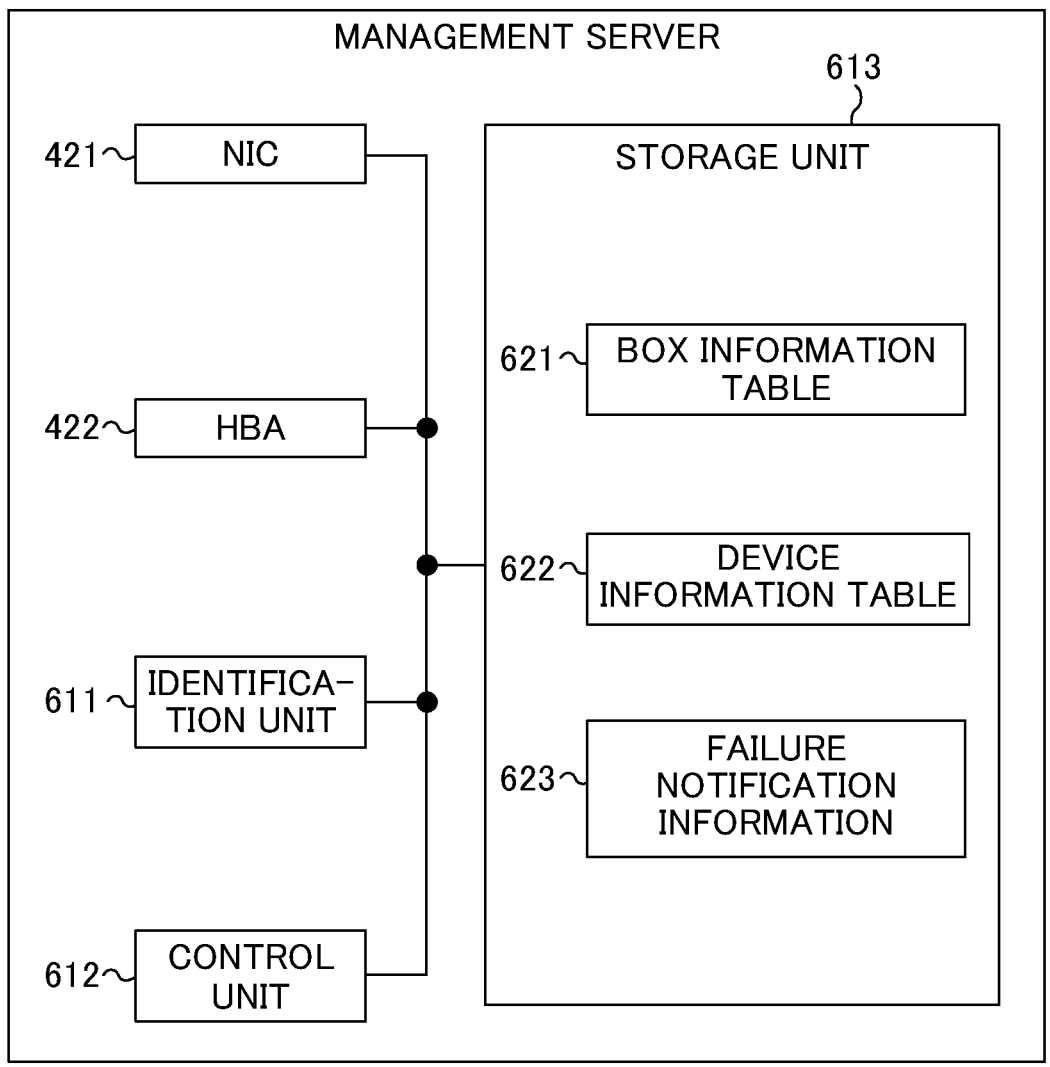
FIG. 6 is a diagram illustrating functional configuration of a management server.

FIG. 6 illustrates an example of functional configuration of the management server 412 of FIG. 4. The management server 412 of FIG. 6 includes an NIC 421, an HBA 422, an identification unit 611, a control unit 612, and a storage unit 613. The identification unit 611 and the storage unit 613 correspond to the identification unit 212 and the storage unit 211 in FIG. 2, respectively. The HBA 422 is an example of a first hardware communication device.

When constructing a logical system configuration, the user inputs box information of each PCIe box 415-*j* using a user terminal apparatus, which is not illustrated, connected to the network switch 411-1. The NIC 421 receives the box information input through the network switch 411-1. The control unit 612 generates a box information table 621 including the received box information and stores the box information table 621 in the storage unit 613.

FIG. 7 illustrates an example of the box information table 621. Entries of the box information table 621 of FIG. 7 include Box #, Rack #, and U #. Box #, Rack #, and U # are associated with one another.

Box # is identification information of the PCIe box 415-*j* to be managed. Rack # is identification information of the rack 401-*k* including the PCIe box 415-*j*. U # is information indicating a position in the rack 401-*k* at which the PCIe box 415-*j* is installed.

In this example, PCIe boxes 415-*j* to be managed are the PCIe box 415-2 and the PCIe box 415-3.

Box #"2" indicates the PCIe box 415-2, and Rack #"1" indicates the rack 401-1. U #"10" indicates height of an installation position of the PCIe box 415-2 in the rack 401-1. Box #"3" indicates the PCIe box 415-3, and Rack #"2" indicates the rack 401-2. U #"20" indicates height of an installation position of the PCIe box 415-3 in the rack 401-2.

When the user adds an PCIe box 415-*j* to the logical system configuration, the user inputs box information of the added PCIe box 415-*j* using the user terminal apparatus. The control unit 612 adds an entry including the input box information to the box information table 621.

When the user removes any PCIe box 415-*j* from the logical system configuration, the user inputs box information of the removed PCIe box 415-*j* using the user terminal apparatus. The control unit 612 deletes an entry including the input box information from the box information table 621.

The user can dynamically change a device 512-*i* to be included in the logical system configuration among the devices 512-*i* stored in the PCIe box 415-*j* to be managed. When a device included in the 512-*i* logical system configuration is changed, the PCIe switch 413-1 outputs configuration change information, which is transferred through the PCIe bus, to the management server 412.

The configuration change information indicates, for example, attachment or detachment of a device 512-1. The attachment of a device 512-*i* refers to a change where the device 512-*i* is added to the logical system configuration for the server 414-*j* by connecting the device 512-*i* to the server 414-*j*. The detachment of a device 512-*i* refers to a change where the device 512-*i* is removed from the logical system configuration for the server 414-*j* by separating the device 512-*i* from the server 414-*j*.

The configuration change information indicating attachment of a device 512-*i* can be described as, for example, "Attached Box:2 Slot:1 BDF:10:00.0". "Attached" indicates attachment.

"Box:2" indicates that Box # of a PCIe box 415-*j* storing the attached device 512-*i* is "2". "Slot:1" indicates that Slot # of a slot 511-*i* to which the attached device 512-*i* is connected is "1". Slot # is identification information of the slot 511-*i*. "BDF:10:00.0" indicates that the BDF of the attached device 512-*i* is "10:00.0".

The configuration change information indicating attachment of a device 512-*i* is an example of device addition information. The attached device 512-*i* is an example of an added specific device, and a BDF of the device 512-*i* is an example of identification information of the specific device. Box # of the PCIe box 415-*j* is an example of identification information of a device storage storing the specific device, and Slot # of the slot 511-*i* is an example of second positional information indicating a storage position of the specific device in the device storage.

The configuration change information indicating detachment of a device 512-*i* can be described as, for example, "Detached Box:2 Slot:1 BDF:10:00.0". "Detached" indicates detachment.

"Box:2" indicates that Box # of a PCIe box 415-*j* that stored the detached device 512-*i* is "2". "Slot:1" indicates that Slot # of a slot 511-*i* to which the detached device 512-*i* was connected is "1". "BDF:10:00.0" indicates that the BDF of the detached device 512-*i* is "10:00.0".

The configuration change information indicating detachment of a device 512-*i* is an example of device removal information. The detached device 512-*i* is an example of a removed specific device, and a BDF of the device 512-*i* is an example of identification information of the specific device. Box # of the PCIe box 415-*j* is an example of identification information of a device storage storing the specific device, and Slot # of the slot 511-*i* is an example of second positional information indicating a storage position of the specific device in the device storage.

The HBA 422 receives configuration change information from the PCIe switch 413-1. If configuration change information indicating attachment of a device 512-*i* is received at a time of constructing a logical system configuration, the control unit 612 extracts Box #, Slot #, and a BDF from the received configuration change information. The control unit 612 then generates a device information table 622 including the extracted Box #, Slot #, and BDF and stores the generated device information table 622 in the storage unit 613.

FIG. 8 illustrates an example of the device information table 622. An entry of the device information table 622 of FIG. 8 includes Box #, Slot #, and the BDF extracted from "Attached Box:2 Slot:1 BDF:10:00.0", which is configuration change information indicating attachment. Box #, Slot #, and the BDF are associated with one another.

Slot # and the BDF included in the device information table 622 are associated with Rack # and U # included in the box information table 621 via Box #. The box information table 621 and the device information table 622 correspond to the management information.

The BDF included in the device information table 622 corresponds to identification information of a device. Rack # and U # included in the box information table 621 correspond to first positional information indicating a position of a device storage. Slot # included in the device information table 622 corresponds to second positional information indicating a storage position of a device in the device storage.

When the server system includes a plurality of PCIe boxes 415-*j*, Rack # and U # of each PCIe box 415-*j* are registered in the box information table 621. As a result, the installation position of the PCIe box 415-*j* can be identified on the basis of the BDF of the device 512-*i*.

If configuration change information indicating attachment of the device 512-*i* is further received after the device information table 622 is generated, the control unit 612 extracts Box #, Slot #, and a BDF from the received configuration change information. The control unit 612 then updates the device information table 622 by adding an entry including the extracted Box #, Slot #, and BDF to the device information table 622.

FIG. 9 illustrates the device information table 622 to which an entry has been added. The device information table 622 of FIG. 9 is generated by adding an entry to the device information table 622 of FIG. 8. The added second entry includes Box #, Slot #, and a BDF extracted from "Attached Box:2 Slot:2 BDF:20:00.0", which is configuration change information indicating attachment.

By adding the entry corresponding to the configuration change information indicating the attachment of the device 512-*i*, the device information table 622 can reflect the change, that is, the addition of the device 512-*i*.

If configuration change information indicating detachment of the device 512-*i* is received after the device information table 622 is generated, the control unit 612 extracts Box #, and Slot #, a BDF from the received configuration change information. The control unit 612 then updates the device information table 622 by deleting an entry including the extracted Box #, Slot #, and BDF from the device information table 622.

FIG. 10 illustrates an example of the device information table 622 from which an entry has been deleted. The device information table 622 of FIG. 10 is generated by deleting the first entry from the device information table 622 of FIG. 9. The deleted first entry includes Box #, Slot #, and a BDF extracted from "Detached Box:2 Slot:1 BDF:10:00.0", which is configuration change information indicating detachment.

By deleting the entry corresponding to the configuration change information indicating the detachment of the device 512-*i*, the device information table 622 can reflect the change, that is, the removal of the device 512-*i*.

When any device 512-*i* fails during operation of a logical system configuration for a server 414-*j*, a BMC 423-*j* in the server 414-*j* is notified of a BDF of the failed device 512-*i* through the PCIe bus. The BMC 423-*j* transmits failed device information including the BDF to the management server 412 through the network switch 411-*k*. The failed device 512-*i* corresponds to a failed device.

The identification unit 611 of the management server 412 receives the failed device information through the NIC 421. Next, the identification unit 611 extracts the BDF from the received failed device information and identifies Rack #, U #, and Slot # associated with the extracted BDF using the box information table 621 and the device information table 622.

First, the identification unit 611 searches the device information table 622 using the extracted BDF as a key and obtains Box # and Slot # associated with the BDF. Next, the identification unit 611 searches the box information table 621 using the obtained Box # as a key and obtains Rack # and U # associated with Box #.

The identification unit 611 then identifies the obtained Rack # and U # as Rack # and U # of a PCIe box 415-*j* storing the failed device 512-*i*. The identification unit 611 then identifies the obtained Slot # as a storage position of the failed device 512-*i* in the PCIe box 415-*j*.

Next, the identification unit 611 generates failure notification information 623 including the identified Rack #, U #, and Slot # and stores the failure notification information 623 in the storage unit 613. The NIC 421 transmits the failure notification information 623 to the user terminal apparatus through the network switch 411-1. As a result, the user can obtain Rack #, U #, and Slot # indicating the position of the failed device 512-*i*. The NIC 421 is an example of a second hardware communication device that outputs failure notification information 623.

As an example, a case where the storage unit 613 stores the box information table 621 of FIG. 7 and the device information table 622 of FIG. 9 and a BDF included in failed device information is "20:00.0" will be described.

In this case, the identification unit 611 obtains Box #"2" and Slot #"2" associated with the BDF "20:00.0" from the device information table 622 of FIG. 9. Next, the identification unit 611 obtains Rack #"1" and U #"10" associated with Box #"2" from the box information table 621 of FIG. 7.

The identification unit 611 then generates failure notification information 623 including Rack #"1", U #"10", and Slot #"2" and transmits the failure notification information 623 to the user terminal apparatus through the NIC 421. Rack #"1" indicates the rack 401-1, U #"10" indicates the installation position of the PCIe box 415-2, and Slot #"2" indicates the slot 511-2.

The user, therefore, can recognize from the failure notification information 623 that the device 512-2 connected to the slot 511-2 of the PCIe box 415-2 in the rack 401-1 has failed.

With the server system of FIG. 4, if any device 512-*i* fails, a position of the failed device 512-*i* can be easily identified from a BDF of which the BMC 423-*j* is notified.

Since the user can quickly obtain a position of the failed device 512-*i* from failure notification information 623 indicating the position of the failed device 512-*i*, time taken to perform maintenance work can be reduced. Since it is only required, at a time of replacement of the failed device 512-*i*, to stop only an application operating in a rack 401-*k* storing the device 512-*i*, availability improves compared to when the entirety of the server system is stopped.

Figure 11:
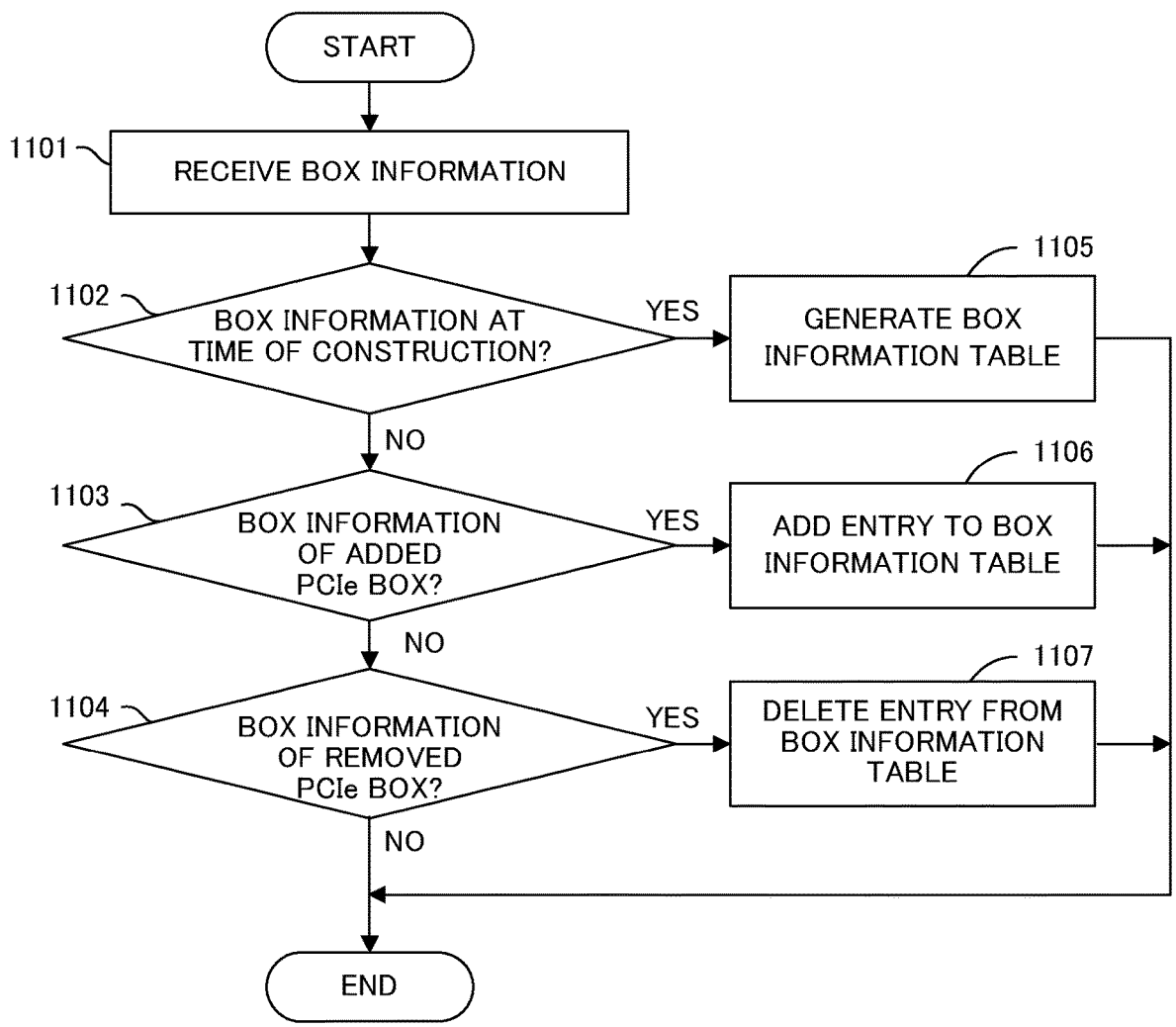
FIG. 11 is a flowchart illustrating a box information table generating process.

FIG. 11 is a flowchart illustrating an example of a box information table generating process performed by the management server 412 of FIG. 6. First, the NIC 421 receives box information input from the user (step 1101), and the control unit 612 checks whether the received box information is box information at a time of construction of a logical system configuration (step 1102).

If the received box information is box information at a time of construction of a logical system configuration (YES in step 1102), the control unit 612 generates a box information table 621 including the received box information (step 1105).

If the received box information is not box information at a time of construction of a logical system configuration (NO in step 1102), the control unit 612 performs processing in step 1103. In step 1103, the control unit 612 checks whether the received box information is box information of an added PCIe box 415-j.

If the received box information is box information of an added PCIe box 415-j (YES in step 1103), the control unit 612 adds an entry including the received box information to the box information table 621 (step 1106).

If the received box information is not box information of an added PCIe box 415-j (NO in step 1103), the control unit 612 performs processing in step 1104. In step 1104, the control unit 612 checks whether the received box information is box information of a removed PCIe box 415-j.

If the received box information is box information of a removed PCIe box 415-j (YES in step 1104), the control unit 612 deletes an entry including the received box information from the box information table 621 (step 1107).

If the received box information is not box information of a removed PCIe box 415-j (NO in step 1104), the control unit 612 ends the process.

Figure 12:
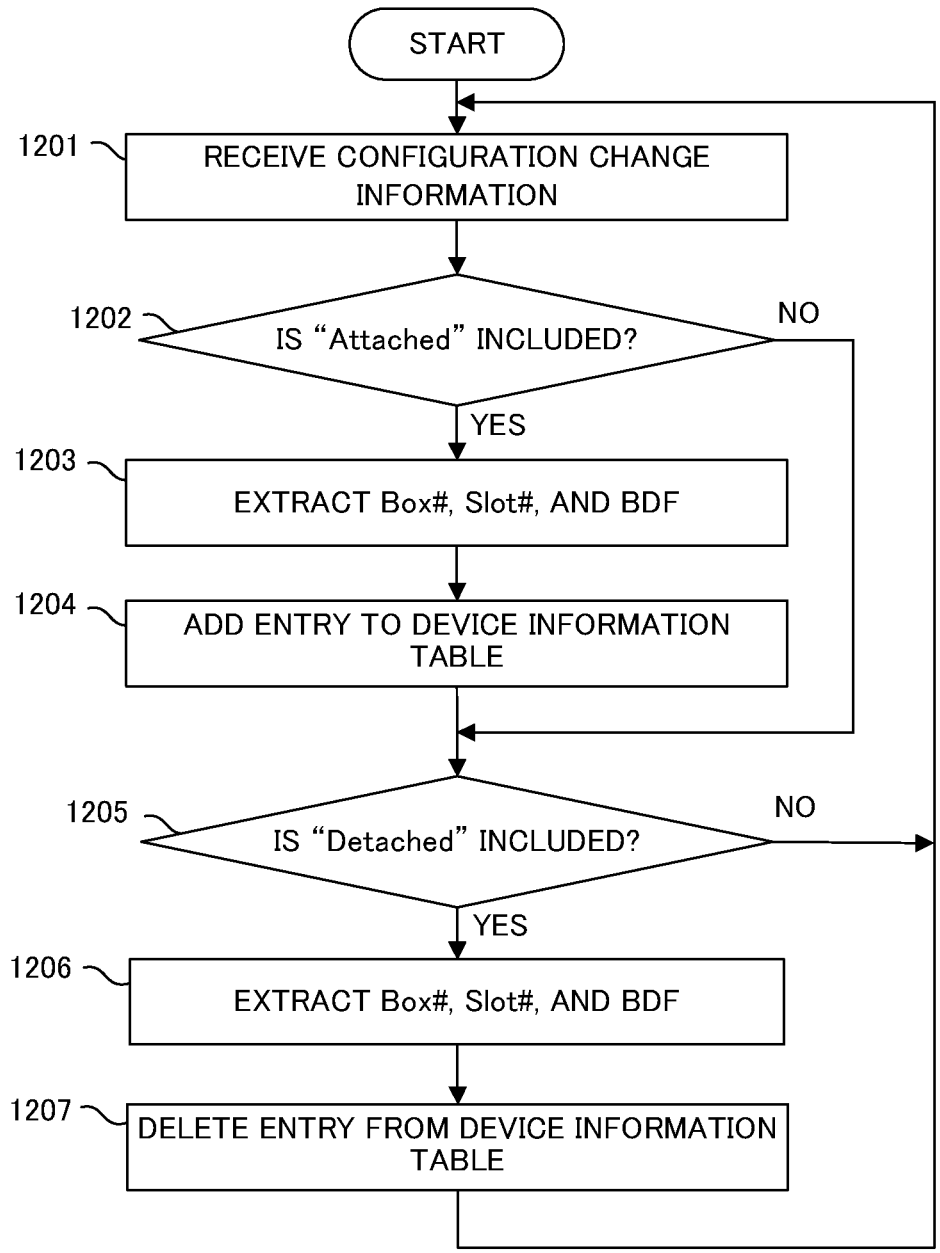
FIG. 12 is a flowchart illustrating a device information table updating process.

FIG. 12 is a flowchart illustrating an example of a device information table updating process performed by the management server 412 of FIG. 6. First, the HBA 422 receives configuration change information from the PCIe switch 413-1 (step 1201), and the control unit 612 checks whether the received configuration change information includes "Attached" (step 1202).

If the received configuration change information includes "Attached" (YES in step 1202), the control unit 612 extracts Box #, Slot #, and a BDF associated with "Attached" from the configuration change information (step 1203). The control unit 612 then adds an entry including the extracted Box #, Slot #, and BDF to the device information table 622 (step 1204).

Next, the control unit 612 checks whether the received configuration change information includes "Detached" (step 1205).

If the received configuration change information includes "Detached" (YES in step 1205), the control unit 612 extracts Box #, Slot #, and a BDF associated with "Detached" from the configuration change information (step 1206). Next, the control unit 612 then deletes an entry including the extracted Box #, Slot #, and BDF from the device information table 622 (step 1207). The management server 412 then repeats the processing in step 1201 and the subsequent steps.

If the received configuration change information does not include "Attached" (NO in step 1202), the control unit 612 performs the processing in step 1205 and the subsequent steps. If the received configuration change information does not include "Detached" (NO in step 1205), the management server 412 performs the processing in step 1201 and the subsequent steps.

Figure 13:
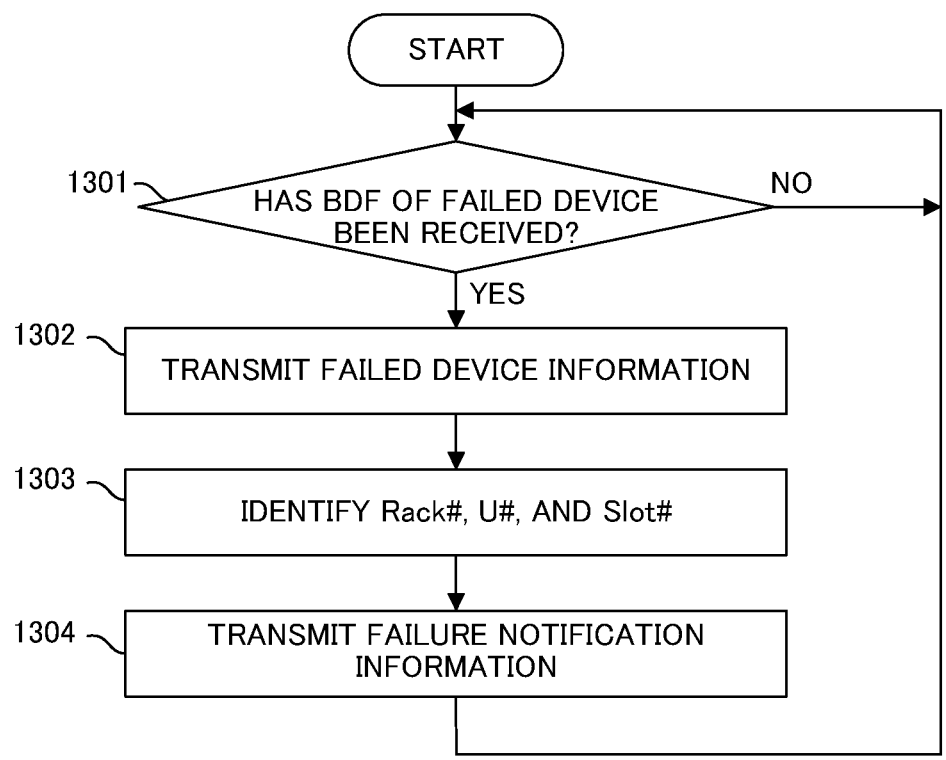
FIG. 13 is a flowchart illustrating a failure notifying process.

FIG. 13 is a flowchart illustrating an example of a failure notifying process performed by the server system of FIG. 4. First, the BMC 423-j checks whether a BDF of a failed device 512-i has been received through the PCIe bus (step 1301).

If a BDF of a failed device 512-i is received (YES in step 1301), the BMC 423-j transmits failed device information including the received BDF to the management server 412 (step 1302). The NIC 421 of the management server 412 receives the failed device information.

Next, the identification unit 611 extracts the BDF from the received failed device information and identifies Rack #, U #, and Slot # associated with the extracted BDF using the box information table 621 and the device information table 622 (step 1303).

Next, the identification unit 611 generates the failure notification information 623 including the identified Rack #, U #, and Slot # and transmits the failure notification information 623 to the user terminal apparatus through the NIC 421 (step 1304). The server system then repeats the processing in step 1301 and the subsequent steps.

If a BDF of a failed device 512-i has not been received (NO in step 1301), the server system repeats the processing in step 1301 and the subsequent steps.

The configuration of the server system of FIGS. 1 and 4 is merely an example, and some components may be omitted or changed in accordance with an application or a condition of the server system.

The configuration of the management apparatus 201 of FIG. 2 is merely an example, and some components may be omitted or changed in accordance with an application or a condition of the management apparatus 201.

The configuration of the PCIe box 415-j of FIG. 5 is merely an example, and some components may be omitted or changed in accordance with the application or the condition of the server system. The configuration of the management server 412 of FIG. 6 is merely an example, and some components may be omitted or changed in accordance with the application or the condition of the server system.

The flowcharts of FIGS. 3 and 11 to 13 are merely examples, and some processing steps may be omitted or changed in accordance with the configuration or the condition of the management apparatus 201 or the server system.

The box information table 621 illustrated in FIG. 7 and the device information table 622 illustrated in FIGS. 8 to 10 are merely examples, and the box information table 621 and the device information table 622 change in accordance with the configuration of the server system.

Figure 14:
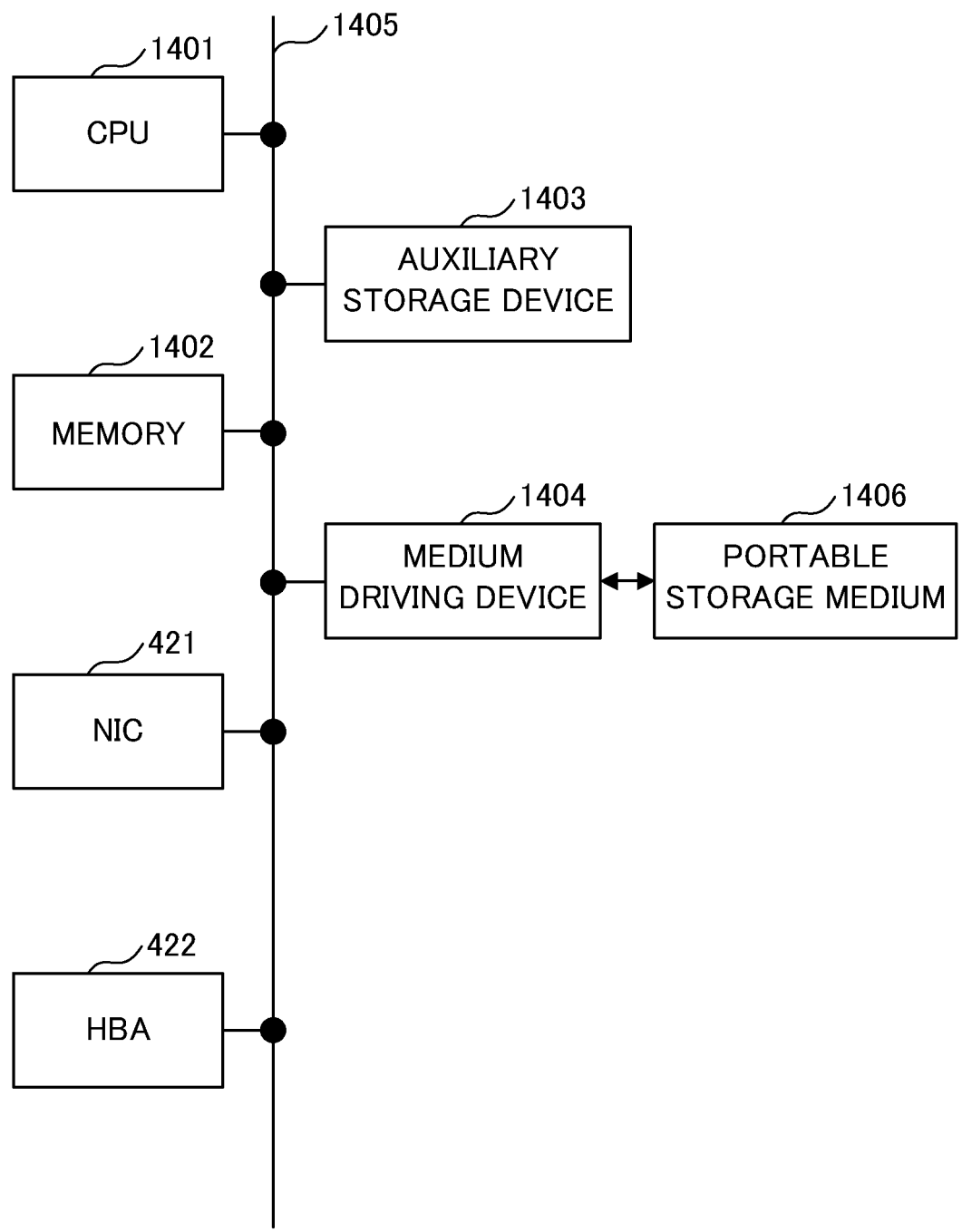
FIG. 14 is a diagram illustrating hardware configuration of an information processing apparatus.

FIG. 14 illustrates an example of hardware configuration of an information processing apparatus used as the management server 412 of FIG. 6. The information processing apparatus of FIG. 14 includes a central processing unit (CPU) 1401, a memory 1402, an auxiliary storage device 1403, a medium driving device 1404, an NIC 421, and an HBA 422. These components are hardware and connected to one another by a bus 1405.

The memory 1402 is, for example, a semiconductor memory such as a read-only memory (ROM) or a random-access memory (RAM) and stores a program and data used for processing. The memory 1402 may operate as the storage unit 211 in FIG. 2 or the storage unit 613 in FIG. 6.

The CPU 1401 (processor) operates as the identification unit 212 of FIG. 2, for example, by executing a program using the memory 1402. The CPU 1401 also operates as the identification unit 611 and the control unit 612 of FIG. 6 by executing a program using the memory 1402.

The auxiliary storage device 1403 is, for example, a magnetic disk device, an optical disc device, a magneto-optical disk device, a tape device, or the like. The auxiliary storage device 1403 may be a hard disk drive or an SSD. The information processing apparatus can store program and data in the auxiliary storage device 1403 and load the program and the data into the memory 1402 for use. The auxiliary storage device 1403 may operate as the storage unit 211 of FIG. 2 and the storage unit 613 of FIG. 6.

The medium driving device 1404 drives a portable storage medium 1406 to access stored contents. The portable storage medium 1406 is a memory device, a flexible disk, an optical disc, a magneto-optical disk, or the like. The portable storage medium 1406 may be a compact disk read-only memory (CD-ROM), a digital versatile disc (DVD), a universal serial bus (USB) memory, or the like. The user can store a program and data in the portable storage medium 1406 and load the program and the data into the memory 1402 for use.

As described above, a computer-readable storage medium storing the program and the data used for processing is a physical (non-transitory) storage medium such as the memory 1402, the auxiliary storage device 1403, or the portable storage medium 1406.

The information processing apparatus need not include all the components of FIG. 14, and some components can be omitted or changed in accordance with an application or a condition of the information processing apparatus. When the auxiliary storage device 1403 or the portable storage medium 1406 is not used, for example, the auxiliary storage device 1403 or the medium driving device 1404 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising:
   a memory that stores management information where identification information of each of a plurality of devices used by an information processing apparatus, first positional information indicating identification information of a rack including a box storing the plurality of devices and an installation position of the box in the rack, and second positional information indicating a storage position of each of the plurality of devices in the box are associated with one another; and
   a processor that receives failed device information including identification information of a failed device among the plurality of devices from the information processing apparatus and that identifies the installation position of the box storing the failed device and a storage position of the failed device in the box from the identification information of the failed device included in the failed device information on a basis of the management information.

2. The management apparatus according to claim 1, wherein the information processing apparatus is capable of accessing the plurality of boxes,
   each of the plurality of boxes stores a plurality of devices,
   the box storing the failed device is one of the plurality of boxes, and
   in the management information, each of the plurality of boxes is used as a box to be managed and identification information of each of the plurality of devices stored in the box to be managed, first positional information indicating a position of the box to be managed, and second positional information indicating a storage position of each of the plurality of devices in the box to be managed are associated with one another.

3. The management apparatus according to claim 2, further comprising a first hardware communication device that receives, when a specific device in a specific one of the plurality of boxes is added to the plurality of devices used by the information processing apparatus, device addition information including identification information of the specific one of the plurality of boxes, identification information of the specific device, and second positional information indicating a storage position of the specific device in the specific one of the plurality of boxes,
   wherein the processor adds, on a basis of the identification information of the specific one of the plurality of boxes, the identification information of the specific device and the second positional information indicating the storage position of the specific device included in the device addition information to the management information in association with first positional information indicating a position of the specific one of the plurality of boxes.

4. The management apparatus according to claim 2, further comprising a first hardware communication device that receives, when a specific device in a specific one of the plurality of boxes is removed from the plurality of devices used by the information processing apparatus, device removal information including identification information of the specific one of the plurality of boxes, identification information of the specific device, and second positional information indicating a storage position of the specific device in the specific one of the plurality of boxes,
   wherein the processor deletes the identification information of the specific device and the second positional information indicating the storage position of the specific device included in the device removal information from the management information.

5. The management apparatus according to claim 1, further comprising a second hardware communication device that outputs failure notification information including the position of the box storing the failed device and the storage position of the failed device.

6. An information processing system comprising:
   an information processing apparatus;
   a box that stores a plurality of devices used by the information processing apparatus;
   a memory that stores management information where identification information of each of the plurality of devices, first positional information indicating identification information of a rack including the box and an installation position of the box in the rack, and second positional information indicating a storage position of each of the plurality of devices in the box are associated with one another; and
   a processor that receives failed device information including identification information of a failed device among the plurality of devices from the information processing apparatus and that identifies the installation position of the box storing the failed device and the storage position of the failed device in the box from the identification information of the failed device included in the failed device information on a basis of the management information.

7. The information processing system according to claim 6, wherein the information processing system comprises a plurality of boxes,
   each of the plurality of boxes stores a plurality of devices,
   the box storing the failed device is one of the plurality of boxes, and in the management information, each of the plurality of
boxes is used as a box to be managed and identification
information of each of the plurality of devices stored in
the box to be managed, first positional information
indicating a position of the box to be managed, and
second positional information indicating a storage position of each of the plurality of devices in the box to be
managed are associated with one another.

8. The information processing system according to claim
7, further comprising a first hardware communication device
that receives, when a specific device in a specific one of the
plurality of boxes is added to the plurality of devices used by
the information processing apparatus, device addition information including identification information of the specific
one of the plurality of boxes, identification information of
the specific device, and second positional information indicating a storage position of the specific device in the specific
one of the plurality of boxes,
  wherein the processor adds, on a basis of the identification
    information of the specific one of the plurality of boxes,
    the identification information of the specific device and
    the second positional information indicating the storage
    position of the specific device included in the device
    addition information to the management information in
    association with first positional information indicating
    a position of the specific one of the plurality of boxes.

9. The information processing system according to claim
7, further comprising a first hardware communication device
that receives, when a specific device in a specific one of the
plurality of boxes is removed from the plurality of devices
used by the information processing apparatus, device
removal information including identification information of
the specific one of the plurality of boxes, identification
information of the specific device, and second positional
information indicating a storage position of the specific
device in the specific one of the plurality of boxes,
  wherein the processor deletes the identification information of the specific device and the second positional
    information indicating the storage position of the specific device included in the device removal information
    from the management information.

10. The information processing system according to claim
6, further comprising a second hardware communication
device that outputs failure notification information including
the position of the box storing the failed device and the
storage position of the failed device.

11. A management method comprising:
  receiving failed device information including identification information of a failed device among a plurality of
    devices used by an information processing apparatus
    from the information processing apparatus; and
  identifying, by a processor, a position of a box storing the
    failed device and a storage position of the failed device
    in the box from the identification information of the
    failed device included in the failed device information
    on a basis of management information where identification information of each of the plurality of devices,
    first positional information indicating identification
    information of a rack including the box storing the
    plurality of devices and an installation position of the
    box in the rack, and second positional information
    indicating a storage position of each of the plurality of
    devices in the box are associated with one another.

12. The management method according to claim 11,
wherein the information processing apparatus is capable of
accessing a plurality of boxes,
  each of the plurality of boxes stores a plurality of devices,
  the box storing the failed device is one of the plurality of
    boxes, and
  in the management information, each of the plurality of
    boxes is used as a box to be managed and identification
    information of each of the plurality of devices stored in
    the box to be managed, first positional information
    indicating a position of the box to be managed, and
    second positional information indicating a storage position of each of the plurality of devices in the box to be
    managed are associated with one another.

13. The management method according to claim 12,
further comprising:
  receiving, when a specific device in a specific one of the
    plurality of boxes is added to the plurality of devices
    used by the information processing apparatus, device
    addition information including identification information of the specific one of the plurality of boxes,
    identification information of the specific device, and
    second positional information indicating a storage position of the specific device in the specific one of the
    plurality of boxes; and
  adding, by the processor on a basis of the identification
    information of the specific one of the plurality of boxes,
    the identification information of the specific device and
    the second positional information indicating the storage
    position of the specific device included in the device
    addition information to the management information in
    association with first positional information indicating
    a position of the specific one of the plurality of boxes.

14. The management method according to claim 12,
further comprising:
  receiving, when a specific device in a specific one of the
    plurality of boxes is removed from the plurality of
    devices used by the information processing apparatus,
    device removal information including identification
    information of the specific one of the plurality of boxes,
    identification information of the specific device, and
    second positional information indicating a storage position of the specific device in the specific one of the
    plurality of boxes; and
  deleting, by the processor, the identification information
    of the specific device and the second positional information indicating the storage position of the specific
    device included in the device removal information from
    the management information.

15. The management method according to claim 11,
further comprising outputting failure notification information including the position of the box storing the failed
device and the storage position of the failed device.

* * * * *